US011301733B2

(12) United States Patent
Shlens et al.

(10) Patent No.: US 11,301,733 B2
(45) Date of Patent: Apr. 12, 2022

(54) LEARNING DATA AUGMENTATION STRATEGIES FOR OBJECT DETECTION

(71) Applicant: Google LLC, Mountain View, CA (US)

(72) Inventors: Jon Shlens, San Francisco, CA (US); Ekin Dogus Cubuk, San Francisco, CA (US); Quoc Le, Sunnyvale, CA (US); Tsung-Yi Lin, Sunnyvale, CA (US); Barret Zoph, San Francisco, CA (US); Golnaz Ghiasi, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 154 days.

(21) Appl. No.: 16/416,848

(22) Filed: May 20, 2019

(65) Prior Publication Data

US 2019/0354817 A1    Nov. 21, 2019

Related U.S. Application Data

(60) Provisional application No. 62/822,630, filed on Mar. 22, 2019, provisional application No. 62/673,777, filed on May 18, 2018.

(51) Int. Cl.
*G06K 9/66* (2006.01)
*G06K 9/62* (2006.01)
(Continued)

(52) U.S. Cl.
CPC ............. *G06K 9/66* (2013.01); *G06K 9/6262* (2013.01); *G06K 9/6267* (2013.01); *G06T 3/20* (2013.01); *G06T 3/60* (2013.01); *G06T 11/001* (2013.01)

(58) Field of Classification Search
USPC .......................................... 382/156, 190, 276
See application file for complete search history.

(56) References Cited

U.S. PATENT DOCUMENTS 10,229,314 B1 * 3/2019 Mitchell ............ G06K 9/00442
2002/0159641 A1 * 10/2002 Whitney .............. G06K 9/6228
382/219

(Continued)

OTHER PUBLICATIONS

Hayder et al. "learning to Co-Generate Object Proposals with a Deep Structured Network", 2016, IEEE conference on Computer Vision and Pattern Recognition,, IEEE pp. 2565-2569 (Year: 2016).*

(Continued)

*Primary Examiner* — Kathleen Y Dulaney
(74) *Attorney, Agent, or Firm* — Dority & Manning, P.A.

(57) ABSTRACT

Example aspects of the present disclosure are directed to systems and methods for learning data augmentation strategies for improved object detection model performance. In particular, example aspects of the present disclosure are directed to iterative reinforcement learning approaches in which, at each of a plurality of iterations, a controller model selects a series of one or more augmentation operations to be applied to training images to generate augmented images. For example, the controller model can select the augmentation operations from a defined search space of available operations which can, for example, include operations that augment the training image without modification of the locations of a target object and corresponding bounding shape within the image and/or operations that do modify the locations of the target object and bounding shape within the training image.

20 Claims, 7 Drawing Sheets
(3 of 7 Drawing Sheet(s) Filed in Color)

(51) Int. Cl.
G06T 3/60 (2006.01)
G06T 3/20 (2006.01)
G06T 11/00 (2006.01)
G06K 9/00 (2006.01)

(56) References Cited

U.S. PATENT DOCUMENTS

| | | | | |
|---|---|---|---|---|
| 2003/0095701 | A1* | 5/2003 | Shum | G06T 11/00 382/155 |
| 2005/0169516 | A1* | 8/2005 | Okajima | G06K 9/623 382/159 |
| 2005/0196035 | A1* | 9/2005 | Luo | G06K 9/00369 382/159 |
| 2012/0288186 | A1* | 11/2012 | Kohli | G06K 9/6255 382/159 |
| 2018/0239952 | A1* | 8/2018 | Rijnders | G06K 9/00201 |
| 2018/0253866 | A1* | 9/2018 | Jain | G06N 7/005 |
| 2018/0349158 | A1* | 12/2018 | Swersky | G06F 9/45516 |
| 2018/0373999 | A1* | 12/2018 | Xu | G06K 9/00765 |
| 2019/0050625 | A1* | 2/2019 | Reinstein | G06K 9/4633 |
| 2020/0065992 | A1* | 2/2020 | Sung | G06K 9/6265 |
| 2021/0097348 | A1* | 4/2021 | Shlens | G06K 9/6262 |

OTHER PUBLICATIONS

Cao et al., "Exploiting Depth from Single Monocular Images for Object Detection and Semantic Segmentation", 2017, IEEE Transactions on Image Processing, vol. 26, No. 2, pp. 836-840. (Year: 2017).*
Shin et al, Data Augmentation Method of Object Detection for Deep Learning in Maritime IMage, 2020 IEEE International Conference on Big Data and Smart Computing, p. 463-466 (Year: 2020).*
Fawzi et al., Adaptive Data Augmentation for Image classification 2016 IEEE pp. 3688-3692. (Year: 2016).*
Talukdar et al, Data Augmentation on Synthetic Images for Transfer Learning using Deep CNNs, 2018 IEEE, pp. 215-219 (Year: 2018).*
Abadi et al., "Tensorflow: A System for Large-Scale Machine Learning", Conference on Operating Systems Design and Implementation, Nov. 2-4, 2016, Savannah, Georgia, pp. 264-283.
Antoniou et al., "Data Augmentation Generative Adversarial Networks", arXiv:1711.04340v1, Nov. 12, 2017, 13 pages.
Baird, "Structured Document Image Analysis" Heidelberg, New York, Springer, 1992, pp. 546-555.
Ciresan et al., "Multi-Column Deep Neural Networks for Image Classification", arXiv: 1202.2745v1, Feb. 13, 2012, 20 pages.
Cubuk et al., "AutoAugment: Learning Augmentation Policies from Data", arXiv:1805.09501v1, May 24, 2018, 14 pages.
Cubuk et al., "Intriguing Properties of Adversarial Examples", arXiv: 1711.02846v1, Nov. 8, 2017, 17 pages.
Dai et al., "Instance-Aware Semantic Segmentation via Multi-Task Network Cascades", Institute of Electrical and Electronics Engineers Conference on Computer Vision and Pattern Recognition, Jun. 26-Jul. 1, 2016, Las Vegas, Nevada, pp. 3150-3158.
DeVries et al., "Dataset Augmentation in Feature Space", arXiv:1702. 05538vl, Feb. 17, 2017, 12 pages.
DeVries et al., "Improved Regularization of Convolutional Neural Networks with Cutout", arXiv:1708.04552v1, Aug. 15, 2017, 8 pages.
Dwibedi et al., "Cut, Paste and Learn: Surprisingly Easy Synthesis for Instance Detection", Institute of Electrical and Electronics Engineers Conference on Computer Vision, Oct. 22-29, 2017, Venice, Italy, pp. 1301-1310.
Everingham et al., "The Pascal Visual Object Classes (VOC) Challenge" International Journal of Computer Vision, vol. 88, Issue 2, Jun. 2010, pp. 303-338.
Ghiasi et al., "DropBlock: A Regularization Method for Convolutional Networks", Conference on Neural Information Processing Systems, Dec. 3-8, 2018, Monteal, Canada, 11 pages.
Ghiasi et al., "NAS-FPN: Learning Scalable Feature Pyramid Architecture for Object Detection", arXiv:1904.07392v1, Apr. 16, 2019, 10 pages.
Girshick et al., Facebook AI Research "Detectron", http://github.com/facebookresearch/Detectron, retrieved on May 30, 2019, 4 pages.
He et al., "Deep Residual Learning for Image Recognition", Institute of Electrical and Electronic Engineers Conference on Computer Vision and Pattern Recognition, Jun. 27-30, 2016, Las Vegas, Nevada, pp. 770-778.
Hu et al., "Squeeze-and-ExcitationNetworks", arXiv:1709. 01507v1, Sep. 5, 2017, 11 pages.
Huang et al., "Speed/Accuracy Trade-Offs for Modem Convolutional Object Detectors", Institute of Electncal and Electronic Engineers Conference on Computer Vision and Pattern Recognition, Jul. 21-26, 2017, Honolulu, Hawaii, pp. 7310-7319.
Jouppi et al., "In—Datacenter Performance Analysis of a Tensor Processing Unit", Association for Computing Machinery and the Institute of Electrical and Electronic Engineers International Symposium on Computer Architecture, Jun. 24-28, 2017, Toronto, Ontario, 12 pages.
Krizhevsky et al., "Imagenet Classification with Deep Convolutional Neural Networks", Conference on Neural Information Processing Systems, Dec. 3-8, 2012, Lake Tahoe, Nevada, 9 pages.
Lemley et al., "Smart Augmentation Learning an Optimal Data Augmentation Strategy", Institute of Electncal and Electtonic Engineers Open Access Journal, vol. 5, May 17, 2017, pp. 5858-5869.
Lin et al., "Focal Loss for Dense Object Detection", Institute of Electrical and Electronic Engineers International Conference on Computer Vision, Oct. 22-29, 2017, Venice, Italy, pp. 2980-2988.
Lin et al., "Microsoft Coco: Common Objects In Context", arXiv: 1405.0312v2, Jul. 5, 2014, 14 pages.
Liu et al., "Progressive Neural Architecture Search", https://arxiv.org/abs/1712.00559v1, Version 1, retrieved on May 23, 2019, 11 pages.
Liu et al., "SSD: Single Shot Multibox Detector", arXiv:1512. 02325v5, Dec. 29, 2016, 17 pages.
Long et al., "Fully Convolutional Networks for Semantic Segmentation", Institute of Electrical and Electronic Engineers Conference on Computer Vision and Pattern Recognition, Jun. 7-12, 2015, Boston, Massachusetts, pp. 3431-3440.
Loshchilov et al., "SGDR: Stochastic Gradient Descent with Warm Restarts", arXiv:1608.03983v2, Aug. 17, 2016, 9 pages.
Mun et al., "Generative Adversarial Network Based Acoustic Scene Training Set Augmentation and Selection Using SVM Hyper-Plane", Detection and Classification of Acoustic Scenes and Events, Nov. 16, 2017, Munich, Germany, 5 pages.
Peng et al., "MegDet: A Large Mini-Batch Object Detector", Institute of Electrical and Electronic Engineers Conference on Computer Vision and Pattern Recognition, Jun. 18-22, 2018, Salt Lake City, Utah, pp. 6181-6189.
Perez et al., "The Effectiveness of Data Augmentation in Image Classification Using Deep Learning", arXiv:1712.04621vl, Dec. 13, 2017, 8 pages.
Pinheiro et al., "Learning to Refine Object Segments", European Conference on Computer Vision, Oct. 8-16, 2016, Amsterdam, The Netherlands, 18 pages.
Qi et al., "PointNet: Deep Learning on Point Sets for 3D Classification and Segmentation", Institute of Electncal and Electronics Engineers Conference on Computer Vision and Pattern Recognition, Jul. 21-27, 2017, Honolulu, Hawaii, pp. 652-660.
Qi et al., "PointNet++: Deep Hierarchical Feature Learning on Point Sets in a Metric Space", Conference on Neural Information Processing Systems, Dec. 4-9, 2017, Long Beach, California, 10 pages.
Ratner et al., "Learning to Compose Domain-Specific Transformations for Data Augmentation", Conference on Neural Information Processing Systems, Dec. 4-9, 2017, Long Beach, California, 11 pages.
Real et al., "Regularized Evolution for Image Classifier Architecture Search", arXiv:1802.01548v6, Oct. 26, 2018, 16 pages.

(56) References Cited

OTHER PUBLICATIONS

Ren et al., "Faster R-CNN: Towards Real-Time Object Detection with Region Proposal Networks", Conference on Neural Information Processing Systems, Dec. 7-12, 2015, Montreal, Canada, 9 pages.

Sato et al., "APAC: Augmented Pattern Classification with Neural Networks", arXiv: 1505.03229v1, May 13, 2015, 9 pages.

Schulman et al., "Proximal Policy Optimization Algorithms", arXiv:1707.06347v2, Aug. 28, 2017, 12 pages.

Simard et al., "Best Practices for Convolutional Neural Networks Applied to Visual Document Analysis", International Conference on Document Analysis and Recognition, Aug. 3-6, 2003, Edinburgh, United Kingdom, 6 pages.

Wild et al., "RenderGAN: Generating Realistic Labeled Data", arXiv:1611.01331v4, Dec. 9, 2016, 15 pages.

Szegedy et al., "Going Deeper with Convolutions", Institute of Electrical and Electronics Engineers Conference on Computer Vision and Pattern Recognition, Jun. 7-12, 2015, Boston, Massachusetts, 9 pages.

Tran et al., "A Bayesian Data Augmentation Approach for Learning Deep Models", Conference on Neural Information Processing Systems, Dec. 4-9, 2017, Long Beach, California, 10 pages.

Verma et al., "Manifold Mixup: Encouraging Meaningful On-Manifold Interpolation as a Regularizer", arXiv: 1806.05236v2, Jul. 9, 2018, 21 pages.

Wan et al., "Regularization of Neural Networks Using Dropconnect", International Conference on Machine Learning, Jun. 16-23, 2013, Atlanta, Georgia, 9 pages.

Wang et al., "A-Fast-RCNN: Hard Positive Generation via Adversary for Object Detection", Institute of Electrical and Electronics Engineers Conference on Computer Vision and Pattern Recognition, Jul. 21-27, 2017, Honolulu, Hawaii, pp. 2606-2615.

Yang et al., "MetaAnchor: Learning to Detect Objects with Customized Anchors", Conference on Neural Information Processing Systems, Dec. 3-8, 2018, Montreal, Canada, 11 pages.

Zagoruyko et al., "Wide Residual Networks", British Machine Vision Conference, Sep. 19-22, 2016, York, United Kingdom, 12 pages.

Zhang et al., "Mixup: Beyond Empirical Risk Minimization", arXiv.org/abs/1710.09412v1, Version 1, Oct. 25, 2017, 11 pages.

Zhong et al., "Random Erasing Data Augmentation", arXiv:1708.04896v2, Nov. 16, 2017, 10 pages.

Zhu et al., "Data Augmentation in Emotion Classification Using Generative Adversarial Networks", arXiv:1711.00648v3, Nov. 16, 2017, 14 pages.

Zoph et al., "Neural Architecture Search with Reinforcement Learning", International Conference on Learning Representations, Apr. 24-26, 2017, Toulon, France, 16 pages.

Zoph et al., "Learning Transferable Architectures for Scalable Image Recognition", Institute of Electrical and Electronics Engineers Conference on Computer Vision and Pattern Recognition, Jul. 21-27, 2017, Honolulu, Hawaii, pp. 8697-8710.

* cited by examiner

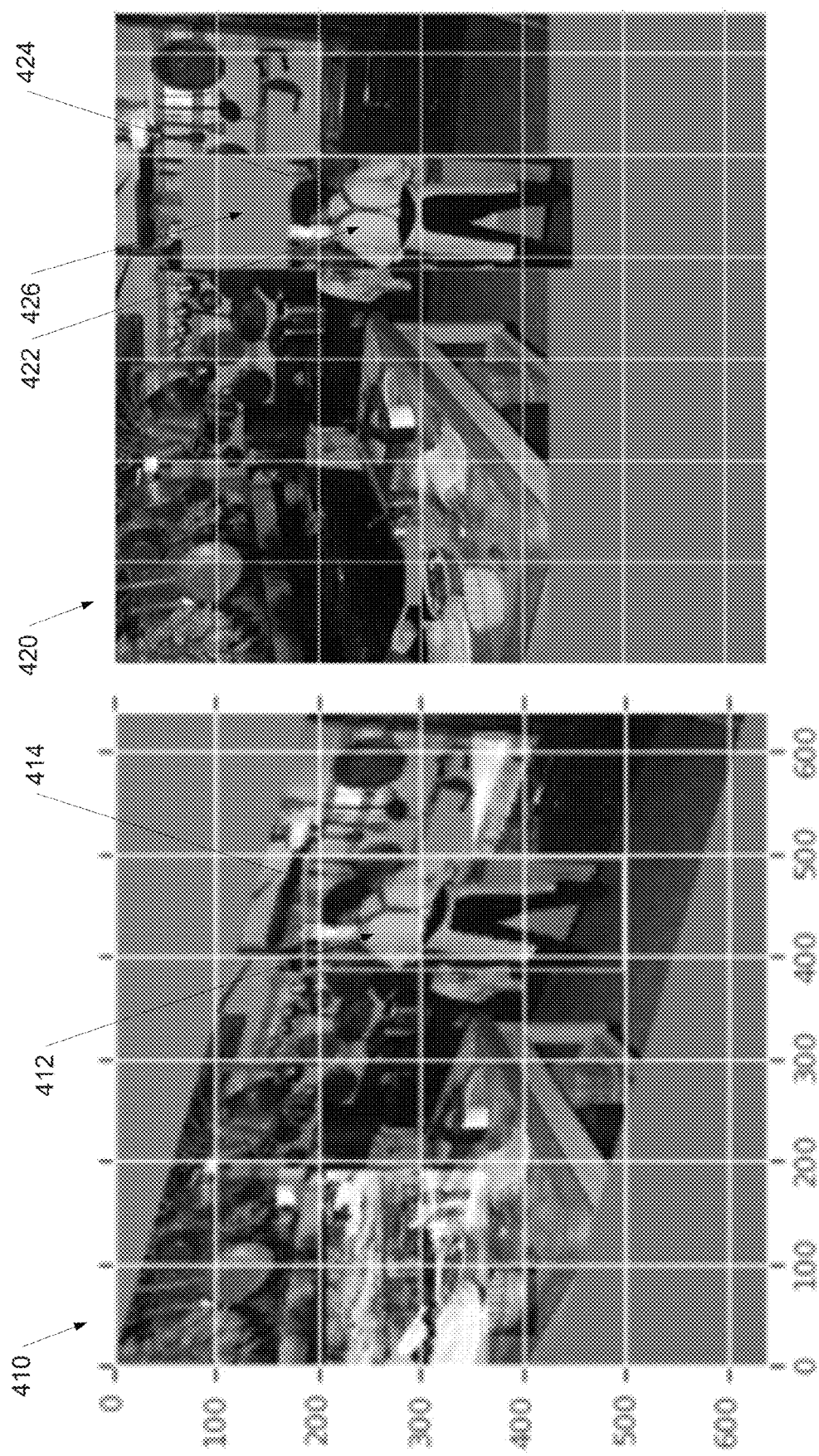

ately clear how to augment the data to generate suitable augmented training data. In addition, because collecting labelled data for object detection problems is relatively more costly, the need for data augmentation in object detection problems is more crucial than for other problems such as image classification. In particular, while a large set of image-level labels exist which may be useful for image classification techniques, there is not an ability to easily obtain images that have been appropriately labeled (e.g., through the use of a bounding box or other bounding shape) for use in learning to perform object detection.

LEARNING DATA AUGMENTATION STRATEGIES FOR OBJECT DETECTION

RELATED APPLICATIONS

This application claims priority to and the benefit of both U.S. Provisional Patent Application No. 62/673,777, filed May 18, 2018 and U.S. Provisional Patent Application No. 62/822,630, filed Mar. 22, 2019. Each of U.S. Provisional Patent Application No. 62/673,777, filed May 18, 2018 and U.S. Provisional Patent Application No. 62/822,630, filed Mar. 22, 2019 is hereby incorporated by reference in its entirety.

FIELD

The present disclosure relates generally to machine learning. More particularly, the present disclosure relates to systems and methods for learning data augmentation strategies for improved object detection model performance.

BACKGROUND

Deep neural networks are powerful machine learning systems that tend to work well when trained on massive amounts of training data. Data augmentation is an effective technique to increase both the amount and diversity of training data by "augmenting" it. For example, some or all of the training examples in the training dataset can be augmented in some way to produce additional augmented examples.

However, for object detection models, it is not immediately clear how to augment the data to generate suitable augmented training data. In addition, because collecting labelled data for object detection problems is relatively more costly, the need for data augmentation in object detection problems is more crucial than for other problems such as image classification. In particular, while a large set of image-level labels exist which may be useful for image classification techniques, there is not an ability to easily obtain images that have been appropriately labeled (e.g., through the use of a bounding box or other bounding shape) for use in learning to perform object detection.

Thus, the application of deep learning object detectors is limited by the amount of manual effort required to collect bounding shape training data. In the real world, each application may require a unique set of detected categories. Manually labeling huge amounts (e.g., tens of thousands) of object bounding shapes for each application is expensive and time-consuming.

SUMMARY

Aspects and advantages of embodiments of the present disclosure will be set forth in part in the following description, or can be learned from the description, or can be learned through practice of the embodiments.

One example aspect of the present disclosure is directed to a computing system that includes one or more processors, a controller model, and one or more non-transitory computer-readable media that collectively store instructions that, when executed by the one or more processors, cause the computing system to perform operations. The operations include accessing a training dataset that comprises a plurality of training images. Each training image has been annotated with a bounding shape. A location of the bounding shape for each training image corresponds to a location of a target object within the training image. The operations include, for each of a plurality of iterations: selecting, by the controller model, a series of one or more augmentation operations; performing the series of one or more augmentation operations on each of one or more training images to generate one or more augmented images; training a machine-learned object detection model based at least in part on the one or more augmented images; and, after training the machine-learned object detection model, evaluating one or more performance characteristics of the machine-learned object detection model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Detailed discussion of embodiments directed to one of ordinary skill in the art is set forth in the specification, which makes reference to the appended figures, in which:

FIG. 3 depicts an example training image including an example target object and bounding shape according to example embodiments of the present disclosure.

FIGS. 4A-C depict example augmented images that have been augmented according to example augmentation operations according to example embodiments of the present disclosure.

Figure 1:
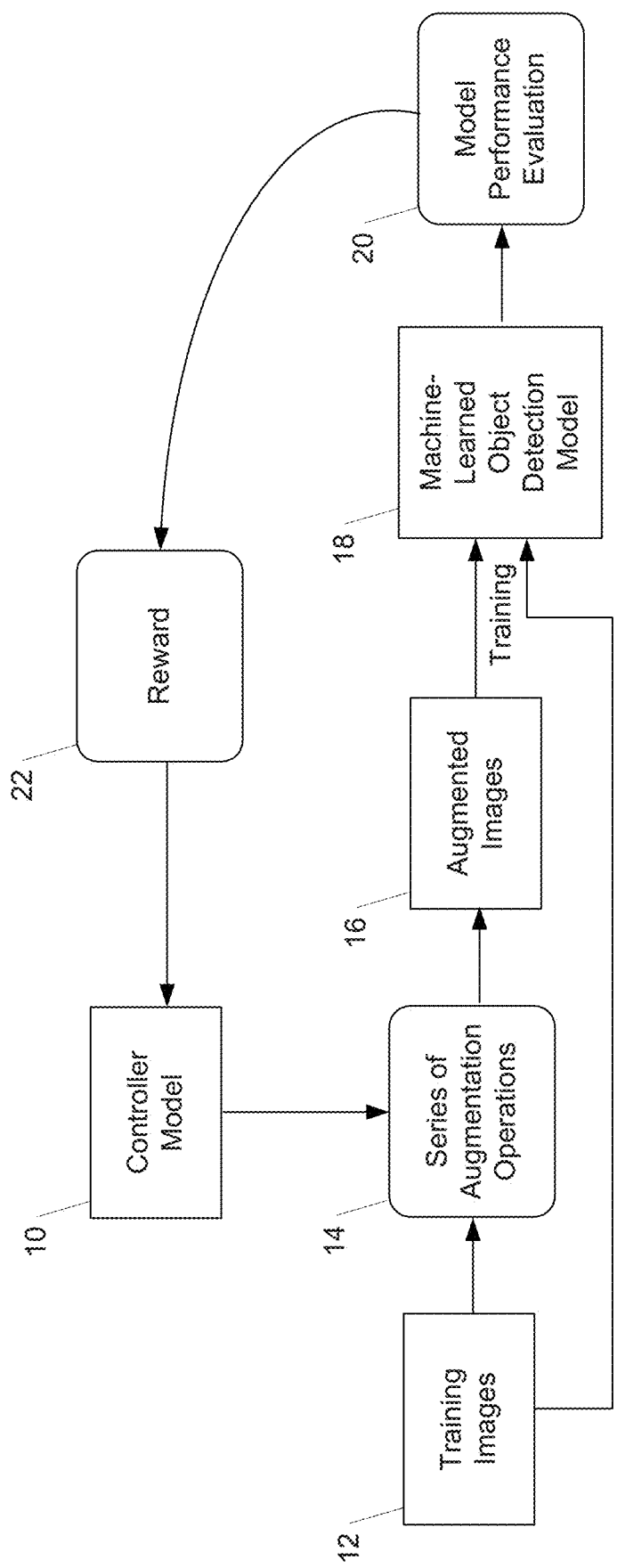
FIG. 1 depicts a block diagram of data flow in an example reinforcement learning approach according to example embodiments of the present disclosure.

Reference numerals that are repeated across plural figures are intended to identify the same features in various implementations.

DETAILED DESCRIPTION

Overview

Example aspects of the present disclosure are directed to systems and methods for learning data augmentation strategies for improved object detection model performance. In particular, example aspects of the present disclosure are directed to iterative reinforcement learning approaches in which, at each of a plurality of iterations, a controller model selects a series of one or more augmentation operations to be applied to training images to generate augmented images. For example, the controller model can select the augmentation operations from a defined search space of available operations which can, for example, include operations that augment the training image without modification of the locations of a target object and corresponding bounding shape within the image and/or operations that do modify the locations of the target object and bounding shape within the training image.

At each iteration, one or more training images can be augmented according to the series of augmentation operations selected by the controller model at the current iteration, thereby generating one or more augmented images. Next, a machine-learned object detection model can be trained using the training data including the augmented images generated at the current iteration and a performance metric (e.g., average precision) can be evaluated for the trained model. According to the reinforcement learning architecture, the controller model can be provided with a reward that is a function of the performance of the model and the parameters of the controller model can be updated based on the reward. In such fashion, the controller model can learn over time to generate augmentation strategies which result in augmented training data which teaches the machine-learned model to perform at an increased performance level.

After a sufficient number of iterations, one or more of the most recently selected series of augmentation operations can be extracted from the iterative process and can be applied to other object detection training data sets to improve the performance of other machine-learned object detection models. As such, aspects of the present disclosure leverage reinforcement learning strategies in combination with a well-designed search space to learn augmentation strategies which can be applied to generic sets of training data to assist the resulting object detection models in improving their performance beyond current state-of-the-art abilities.

Thus, the present disclosure provides systems that can develop a learned strategy for data augmentation for object detection problems. In particular, the proposed systems can create a set of transformations that can be applied to training imagery. The transformations can include transformations that can be applied to the whole image without modification of the bounding shape locations (e.g., color transformations), transformations that affect the whole image while changing the bounding shape locations (e.g. translating or shearing of the whole image), and/or transformations that are only applied to content within the bounding shape.

The systems and methods of the present disclosure provide a number of technical effects and benefits. As one example technical effect and benefit, the systems and methods described herein can result in the generation of augmented training data which can be used to learn machine-learned models with improved performance characteristics (e.g., improved average precision). Thus, aspects of the present disclosure improve the performance of a computing system in detecting objects in imagery.

As another example technical effect and benefit, the systems and methods of the present disclosure are able to generate optimal augmentation strategies much faster and using much fewer computing resources (e.g., less processing power, less memory usage, less power consumption, etc.), for example as compared to a manual approach which would require significantly more trials than the proposed learning approach. Thus, the search technique described herein can automatically find significantly better augmentation strategies than existing approaches and can enable achievement of new state-of-the-art results.

As another example technical effect and benefit, by providing systems that enable generation of augmented training data which can effectively be used to supplement existing training data, the present disclosure can mitigate the cost of labeling a large number of bounding shapes for training an object detector. Stated differently, because the systems and methods of the present disclosure can generate augmentation strategies which enable the generation of effective augmented training data, the size of the training dataset needed to reach certain desired performance levels can be reduced, thereby reducing the amount of manual labelling effort and cost that must be expended to create a class-specific object detection training datasets.

In some implementations, the data augmentation techniques described herein can be provided as a service to users that is included in a holistic machine learning platform. For example, a user can upload or otherwise expose their training data to the platform and can use the techniques described herein or augmentation strategies derived therefrom to generate augmented training data. The user can then train one or more models and deploy them from the platform.

With reference now to the Figures, example embodiments of the present disclosure will be discussed in further detail.

Example Devices and Systems

FIG. 1 depicts a block diagram of data flow in an example reinforcement learning approach according to example embodiments of the present disclosure. In particular, the illustrated approach can be applied in an iterative fashion. The illustrated approach includes a controller model 10 which can operate to select, at each iteration, a series of augmentation operations 14 to be applied to one or more training images 12 to respectively generate one or more augmented images 16.

In particular, the training images 12 can be images that have been annotated to make them useful for an object detection task. For example, each image 12 can depict at least one instance of a target object of a target category that it is desired for a machine-learned object detection model 18 to learn to detect. The annotation to each image 12 can include information that identifies the target category and the location of the target object within the image. For example, the annotation for each image 12 can include a bounding shape, where a location of the bounding shape corresponds to the location of the target object within the image 12.

A bounding shape can include a two-dimensional polygonal shape (e.g., a bounding box), a three-dimensional polygonal shape; and/or an arbitrary shape (e.g., a set of pixels that have been assigned as depicting an object which may be referred to as an object segmentation). The training images 12 can include traditional visible spectrum images (e.g., photographs), aerial images, street-level images, Light Detection and Ranging (LIDAR) images, Radio Detection and Ranging (RADAR) images, infrared images, hyperspectral images, and/or various other forms of imagery.

The controller model 10 can be configured to, for each of a number of iterations, select a series of one or more augmentation operations 14. In particular, in some implementations, the controller model 10 can select the series of one or more augmentation operations from a defined search space that includes a plurality of available augmentation operations. The defined search space can include various operations and/or other searchable parameters that have been designed and/or modified by a user to guide the search process.

In some implementations, the controller model 10 can also select/search other respective characteristics for each selected operation such as: a respective probability of performance of the operation; a respective probability that the operation will be applied only to the respective bounding shape of the image; and/or a respective augmentation magnitude that controls a relative intensity of application of the operation to the image.

Thus, in some implementations, the controller model 10 can select a series of operations and the characteristics for each operation. As one example, the output of the controller model 10 can be represented as: {(Operation $O_1$, overall operation probability $p_1^o$, applied only to bounding shape with probability $p_1^b$, magnitude $m_1$), (Operation $O_2$, overall operation probability applied only to bounding shape with probability $p_2^b$, magnitude $m_2$), . . . , (Operation $O_N$, overall operation probability $p_N^o$, applied only to bounding shape with probability $p_N^b$, magnitude $m_N$)}.

In other implementations, some or all of the available operations within the search space can be specifically defined as to whether such operation is applied to the image as a whole or to only the image content within the bounding shape. Thus, for such operations, the controller model 10 does not need to separately select a respective probability that the operation will be applied only to the respective bounding shape of the image.

In some implementations, for each iteration, the number N of augmentation operations in the series of augmentation operations can be a user-selected hyperparameter. In other implementations, the number N of augmentation operations in the series of one or more augmentation operations is selected by the controller model.

In some implementations, the set of available augmentation operations can include one or more color operations that modify color channel data associated with at least a portion of the image (e.g., without impacting the locations of the bounding shapes). For example, the portion of the image to which each augmentation operation is applied can include all of the image (e.g., all image pixels) or can include only the image content included within the corresponding bounding shape (e.g., image pixels within the corresponding bounding box). Thus, references to a "portion" of the image can, as examples, include the entirety of the image or the image content within the bounding shape.

As examples, the color operations can include:

An auto contrast operation that maximizes the image contrast in at least the portion of the image, for example, by making the darkest pixel in the portion black and the lightest pixel in the portion white;

An equalize operation that equalizes a histogram of the image portion;

A solarize operation that inverts all pixels of the image portion above a threshold value of magnitude;

A posterize operation that reduces the number of bits for each pixel to a certain magnitude number of bits;

A contrast operation that controls a contrast of the image portion (e.g., a magnitude=0 gives a gray image, whereas a magnitude=1 gives the original image);

A color balance operation that adjusts the color balance of the image portion (e.g., in a manner similar to the color controls on a television set) (e.g., a magnitude=0 gives a black and white image, whereas a magnitude=1 gives the original image);

A brightness operation that adjusts the brightness of the image portion (e.g., a magnitude=0 gives a black image, whereas a magnitude=1 gives the original image);

A sharpness operation that adjusts the sharpness of the image portion (e.g., a magnitude=0 gives a blurred image, whereas a magnitude=1 gives the original image); and A cutout operation that sets a random square patch of side-length magnitude pixels to gray.

In some implementations, the set of available augmentation operations can include one or more geometric distortion operations that geometrically distort at least a portion of the image. As examples, the geometric distortion operations can include one or more of:

A shear operation that shears the image portion (e.g., including the corners of the bounding boxes) along the horizontal or vertical axis with rate magnitude;

A translate operation that translates the image portion (e.g., including the bounding box) in the horizontal or vertical direction by magnitude number of pixels;

A rotate operation that rotates the image portion (e.g., including the bounding box) by magnitude degrees;

A flipping operation that flips the image portion about a horizontal or vertical axis; and A shift bounding shape operation that shifts (e.g., randomly) the bounding box content in the horizontal or vertical direction. The bounding box moves with the object.

In some implementations, the controller can select the respective augmentation magnitude for at least one of the augmentation operations from a respective set of discrete and operation-specific available magnitudes. For example, the set of discrete and operation-specific available magnitudes can be user-selected hyperparameters. In some implementations, the set of discrete magnitudes can be a range of discrete magnitudes. The table provided below provides example operations and example ranges of potential magnitudes for the example operations.

| Operation Name | Description | Range of magnitudes |
| --- | --- | --- |
| ShearX(Y) | Shear the image and the corners of the bounding boxes along the horizontal (vertical) axis with rate magnitude. | [−0.3, 0.3] |
| TranslateX(Y) | Translate the image and the bounding boxes in the horizontal (vertical) direction by magnitude number of pixels. | [−150, 150] |
| Rotate | Rotate the image and the bounding boxes magnitude degrees. | [−30, 30] |
| Equalize | Equalize the image histogram. | |
| Solarize | Invert all pixels above a threshold value of magnitude. | [0, 256] |
| SolarizeAdd | For each pixel in the image that is less than 128, add an additional amount to it decided by the magnitude. | [0, 110] |
| Contrast | Control the contrast of the image. A magnitude = 0 gives a gray image, whereas magnitude = 1 gives the original image. | [0.1, 1.9] |
| Color | Adjust the color balance of the image, in a manner similar to the controls on a colour TV set. A magnitude = 0 gives a black & white image, whereas magnitude = 1 gives the original image. | [0.1, 1.9] |
| Brightness | Adjust the brightness of the image. A magnitude = 0 gives a black image, whereas magnitude = 1 gives the original image. | [0.1, 1.9] |
| Sharpness | Adjust the sharpness of the image. A magnitude = 0 gives a blurred image, whereas magnitude = 1 gives the | [0.1, 1.9] |

| Operation Name | Description | Range of magnitudes |
|---|---|---|
| | original image. | |
| Cutout | Set a random square patch of side-length magnitude pixels to gray. | [0, 60] |
| BBox_Only_X | Apply X to each bounding box content with independent probability, and magnitude that was chosen for X above. Location and the size of the bounding box are not changed.| | |

At each iteration, one or more training images 12 can be augmented according to the series of augmentation operations 14 selected by the controller model 10 at the current iteration, thereby generating one or more augmented images 16. Next, a machine-learned object detection model 18 can be trained using the training data including the augmented images 16 generated at the current iteration. A performance metric 20 (e.g., average precision, accuracy, latency, model data size, and/or various other measures of model performance) can be evaluated for the trained model 18.

According to the reinforcement learning architecture, the controller model 10 can be provided with a reward 22 that is a function of the performance 20 of the model 18. The parameters of the controller model 10 can be updated based on the reward. For example, the controller model 10 can be a recurrent neural network and the reward function can be backpropagated through the recurrent neural network to train the network. In such fashion, the controller model 10 can learn over time to generate augmentation strategies 14 which result in augmented training data 16 which teaches the machine-learned model 18 to perform at an increased performance level.

Although aspects of the present disclosure focus on a reinforcement learning approach, other example embodiments may operate according to an evolutionary scheme. For example, in the evolutionary scheme, the controller model 10 can be configured to generate a new series of augmentation operations 14 through an evolutionary mutation. The performance 20 of the model 18 obtained via the most recently proposed augmentation strategy 14 can be compared to a best previously observed performance to determine, for example, whether to retain the most recently proposed augmentation strategy 14 or to discard the most recently proposed augmentation strategy 14 and instead return to a best previously observed augmentation strategy. Thereafter, to generate the next iterative augmentation strategy 14, the controller model can perform evolutionary mutations on the augmentation strategy selected based on the comparison described above.

Figure 2A:
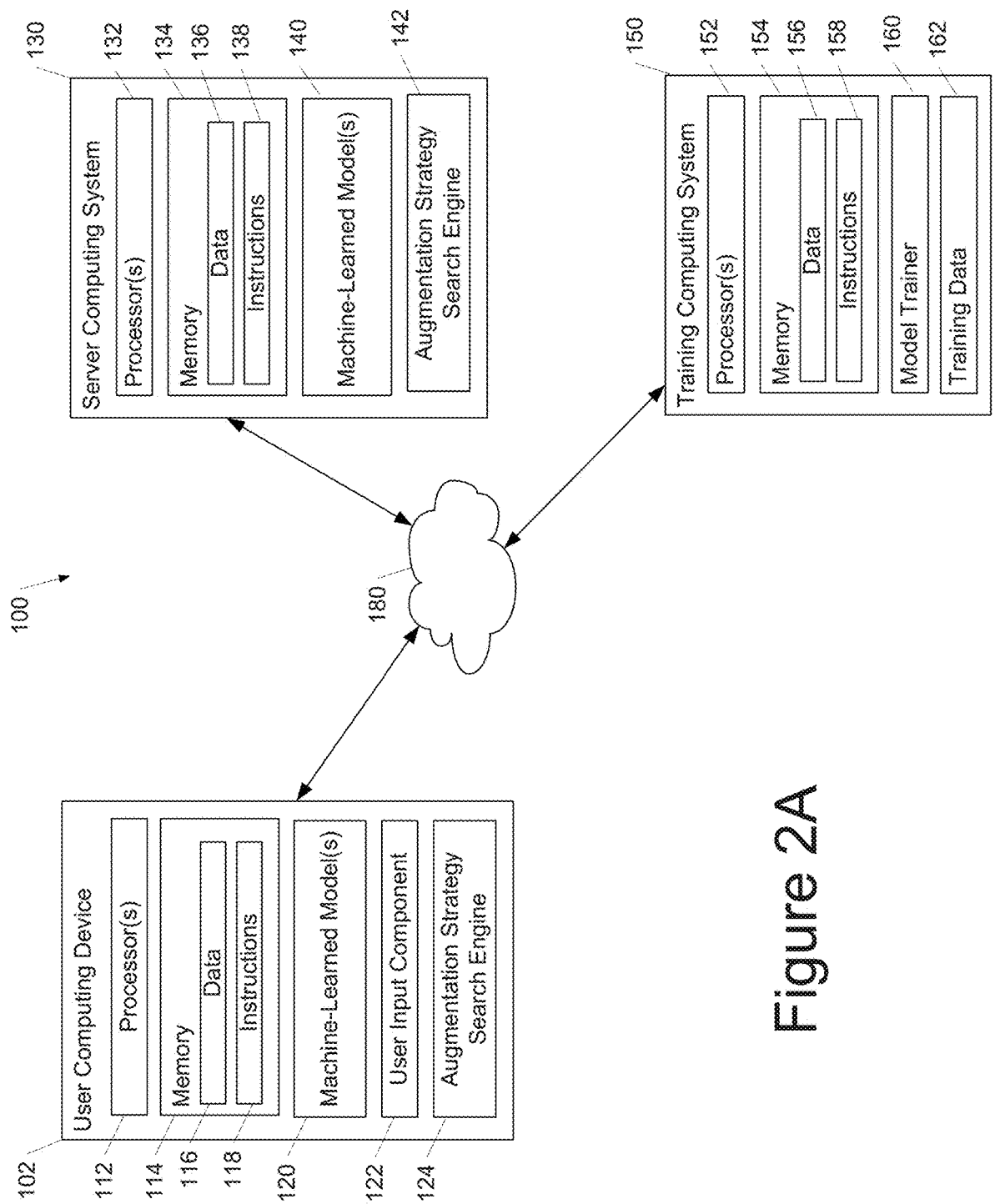
FIG. 2A depicts a block diagram of an example computing system according to example embodiments of the present disclosure.

FIG. 2A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIG. 1. In particular, example machine-learned models can include the controller model 10 and the machine-learned object detection model 18 of FIG. 1.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a data augmentation service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The user computing device 124 can include an augmentation strategy search engine 124. The augmentation strategy search engine 124 can perform any of the augmentation strategy search techniques described herein, including the iterative approach illustrated in FIG. 1. The augmentation strategy search engine 124 can be implemented in software, hardware, and/or firmware. For example, the augmentation strategy search engine 124 can be embodied in computer-readable instructions stored in the memory 114 and executed by the processors 112.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 1. In particular, example machine-learned models can include the controller model 10 and the machine-learned object detection model 18 of FIG. 1.

The server computing device 130 can include an augmentation strategy search engine 142. The augmentation strategy search engine 142 can perform any of the augmentation strategy search techniques described herein, including the iterative approach illustrated in FIG. 1. The augmentation strategy search engine 142 can be implemented in software, hardware, and/or firmware. For example, the augmentation strategy search engine 142 can be embodied in computer-readable instructions stored in the memory 134 and executed by the processors 132.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, the training images 12 and/or the augmented images 16 shown in FIG. 1.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 2A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 2B:
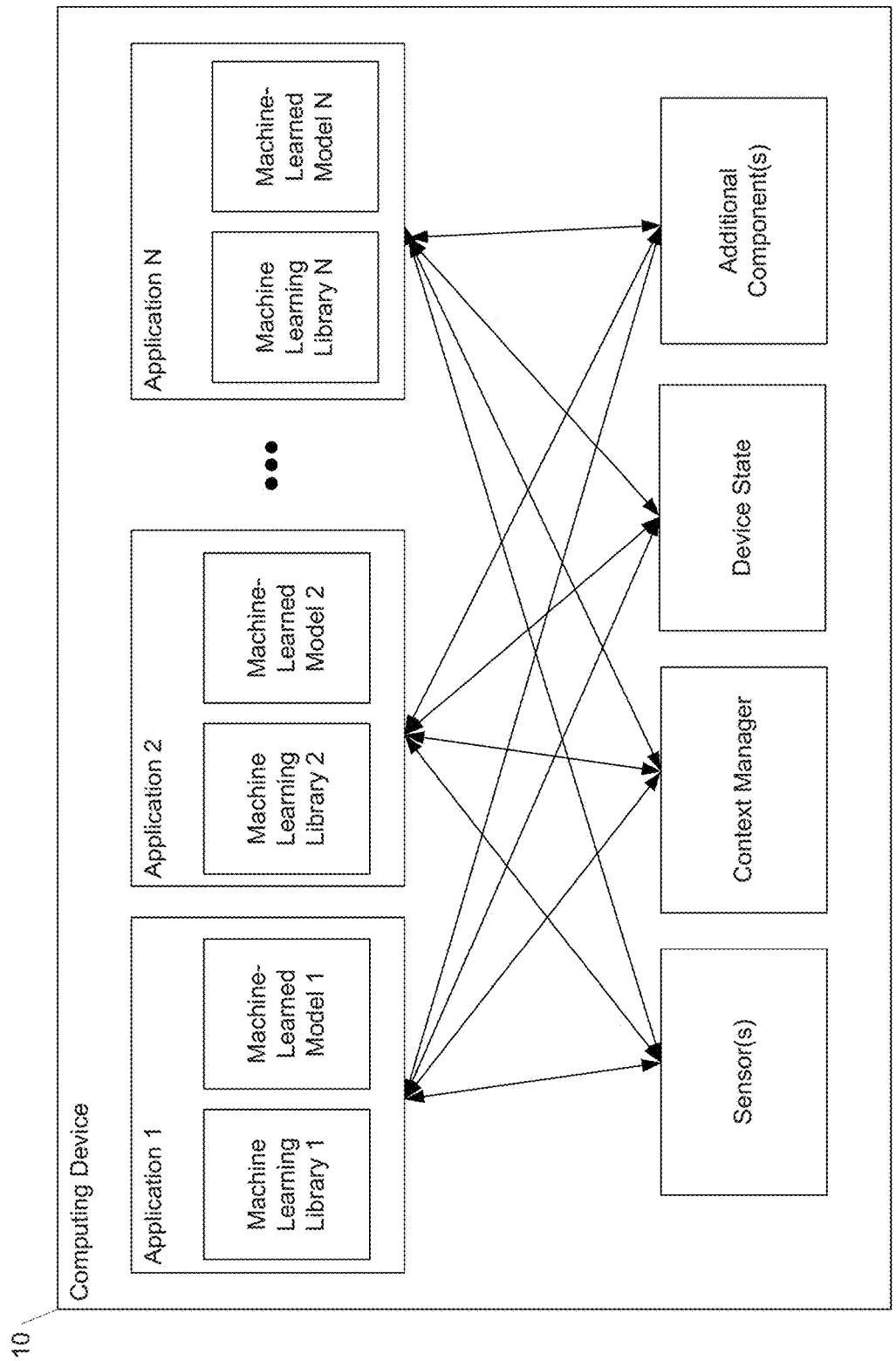
FIG. 2B depicts a block diagram of an example computing device according to example embodiments of the present disclosure.

FIG. 2B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 2B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 2C:
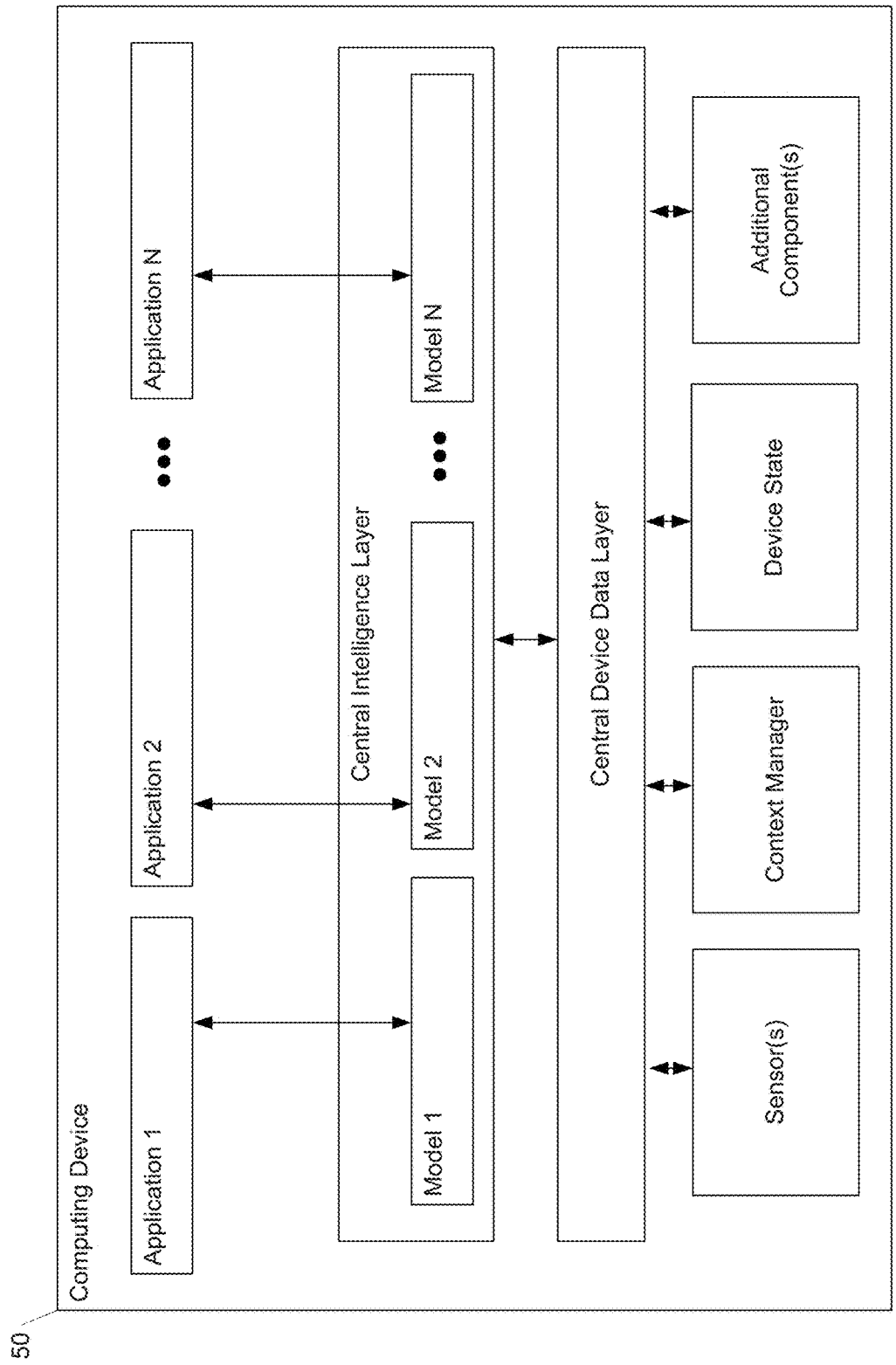
FIG. 2C depicts a block diagram of an example computing device according to example embodiments of the present disclosure.

FIG. 2C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 2C, a respective machine-learned model (e.g., a model) can be provided for each application and managed by the central intelligence layer. In other implementations, one or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 2C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Training Images

Figures 3, 4A:
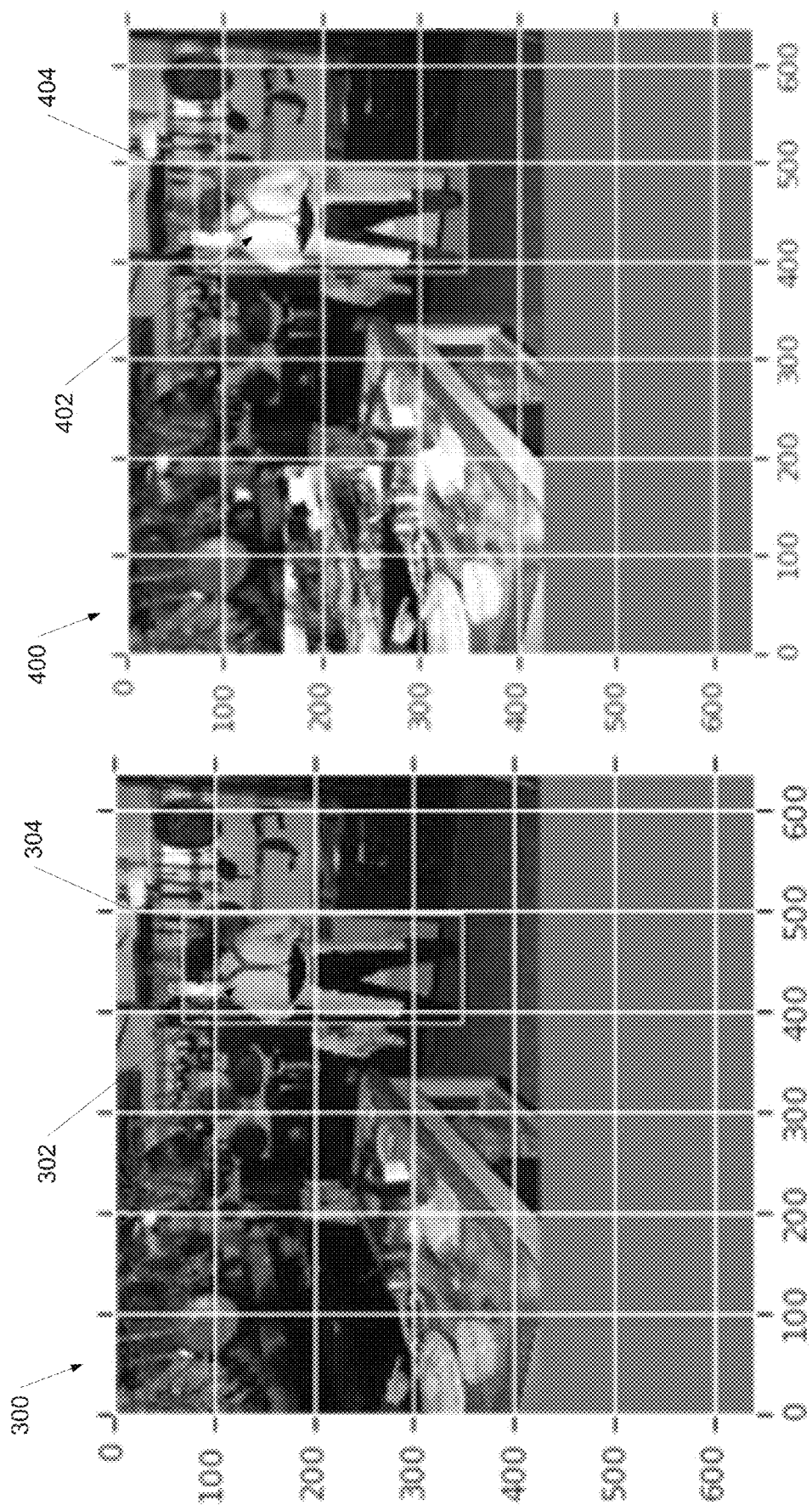

FIG. 3 depicts an example training image 300 including an example target object 302 and bounding shape 304 according to example embodiments of the present disclosure. In particular, in the illustrated example image 300, the target object 302 is a human person and the bounding shape 304 indicates the location of the target object 302 within the image 300.

FIGS. 4A-C depict example augmented images that have been augmented according to example augmentation operations according to example embodiments of the present disclosure. In particular, each of the augmented images in FIGS. 4A-C has been generated through application of an example augmentation operation to the example training image 300 of FIG. 3.

FIG. 4A depicts an example augmented image 400 that results from applying a bounding-shape-only equalize operation to the image 300 of FIG. 3. In particular, as illustrated in FIG. 4A, only the color data of the content 402 of the image 400 that is within the bounding shape 404 has been equalized. However, the location of the content 402 and the shape 404 has not been modified.

FIG. 4B depicts an example augmented image 410 that results from applying a shear operation to the image 300 of FIG. 3 in a Y direction. In particular, as illustrated in FIG. 4B, the image 410 has been sheared in the Y direction. In the illustrated example, the bounding shape 414 has not been sheared. However, its location in the global space has been updated to match movement of the target object 412. In other instances, the bounding shape 414 can be sheared as well.

FIG. 4C depicts an example augmented image 420 that results from applying a shift bounding shape operation to the image 300 of FIG. 3 in a Y direction. In particular, as illustrated in FIG. 4C, the bounding shape 424 and the content 422 included in the bounding shape 424 has been shifted relative to the remainder of the image 420. A vacated space 426 can be filled with a fill color. The fill color can be a fixed, neutral color or can be a color that results from averaging the values of all pixels in the image.

Figure 5:
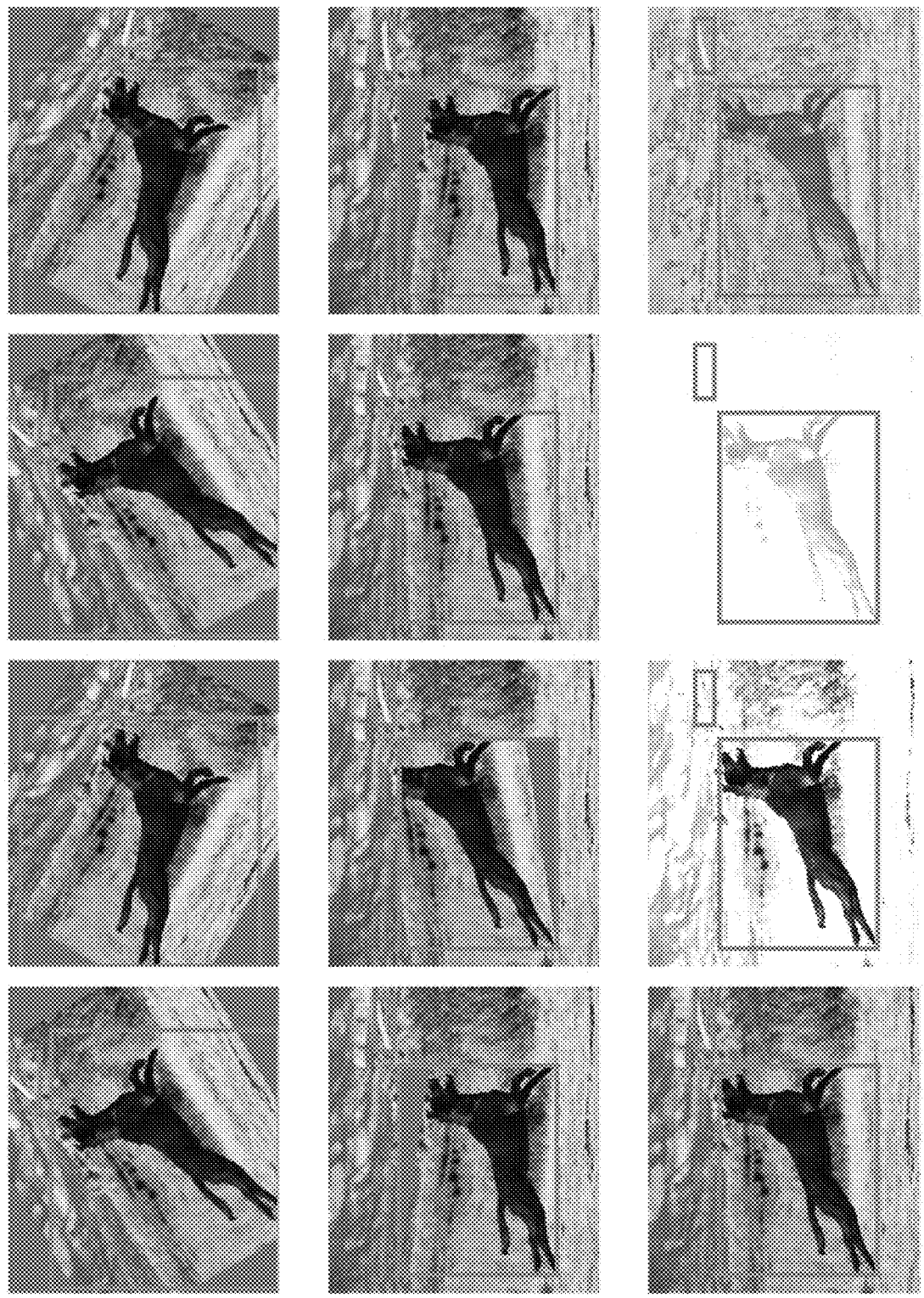
FIG. 5 depicts example augmented images that have been augmented according to example augmentation operations according to example embodiments of the present disclosure.

FIG. 5 gives example images that have been augmented according to example learned augmentation sub-policies. Three examples of learned sub-policies applied to one example image. Each column of FIG. 5 corresponds to a different random sample of this policy. Each step of the example augmentation policy consists of a triplet corresponding to the operation, the probability of application and a magnitude measure. The bounding box is adjusted to maintain consistency with the applied augmentation. Note the probability and magnitude are discretized values. The three example sub-policies illustrated via FIG. 5 are as follows:

Sub-policy 1. (Color, 0.3, 8), (Rotate, 0.8, 10)
Sub-policy 2. (BBoxes Only ShearY, 0.8, 5)
Sub-policy 3. (SolarizeAdd, 0.6, 8), (Brightness, 0.8, 10)

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system comprising:
   one or more processors;
   a controller model comprising a first neural network configured to select augmentation operations; and
   one or more non-transitory computer-readable media that collectively store instructions that, when executed by the one or more processors, cause the computing system to perform operations, the operations comprising:

accessing a training dataset that comprises a plurality of training images, wherein one or more training images of the plurality of training images has been annotated with a bounding shape, and wherein a location of the bounding shape for the one or more training images corresponds to a location of a target object within the one or more training images; and for each of a plurality of iterations:
selecting, by the first neural network of the controller model, a series of one or more augmentation operations;

performing the series of one or more augmentation operations on each of the one or more training images to generate one or more augmented images;

training a machine-learned object detection model based at least in part on the one or more augmented images, wherein the machine-learned object detection model comprises a second neural network configured to detect objects in imagery, and wherein the second neural network is separate from the first neural network;

after training the machine-learned object detection model, evaluating one or more performance characteristics of the machine-learned object detection model;

evaluating a reward function based at least in part on the one or more performance characteristics; and modifying one or more parameters of the first neural network based on the reward function.

2. The computing system of claim 1, wherein selecting, by the first neural network of the controller model, the series of one or more augmentation operations comprises selecting, by the first neural network of the controller model, the series of one or more augmentation operations from a defined search space that includes a plurality of available augmentation operations.

3. The computing system of claim 2, wherein the plurality of available augmentation operations comprise one or more color operations that modify color channel data associated with at least a portion of the one or more training images.

4. The computing system of claim 3, wherein the one or more color operations comprise one or more of:
an auto contrast operation;
an equalize operation;
a solarize operation;
a posterize operation;
a contrast operation;
a color balance operation;
a brightness operation;
a sharpness operation; and
a cutout operation.

5. The computing system of claim 2, wherein the plurality of available augmentation operations comprise one or more geometric distortion operations that geometrically distort at least a portion of the one or more training images.

6. The computing system of claim 5, wherein the one or more geometric distortion operations comprise one or more of:
a shear operation;
a translate operation;
a rotate operation;
a flipping operation; and
a shift bounding shape operation.

7. The computing system of claim 2, wherein the plurality of available augmentation operations comprise:

one or more operations that augment the one or more training images without modification of the location of the bounding shape or the location of the target object within the one or more training images; and one or more operations that modify the location of the bounding shape and the location of the target object within the one or more training images.

8. The computing system of claim 1, wherein:
selecting, by the first neural network of the controller model, the series of one or more augmentation operations comprises selecting, by the first neural network of the controller model, a respective probability of performance for each of the one or more augmentation operations; and performing the series of one or more augmentation operations comprises performing each of the one or more augmentation operations with probability equal to the respective probability of performance.

9. The computing system of claim 1, wherein:
selecting, by the first neural network of the controller model, the series of one or more augmentation operations comprises selecting, by the first neural network of the controller model, a respective probability that each of the one or more augmentation operations will be applied only to the bounding shape of the one or more training images; and performing the series of one or more augmentation operations comprises applying each augmentation operation to only the bounding shape of the one or more training images with probability equal to the respective probability.

10. The computing system of claim 1, wherein:
selecting, by the first neural network of the controller model, the series of one or more augmentation operations comprises selecting, by the first neural network of the controller model, a respective augmentation magnitude for at least one of the augmentation operations; and performing the series of one or more augmentation operations comprises performing the at least one of the augmentation operations according to the respective augmentation magnitude.

11. The computing system of claim 10, wherein selecting, by the first neural network of the controller model, the respective augmentation magnitude for at least one of the augmentation operations comprises selecting, by the first neural network of the controller model, the respective augmentation magnitude for at least one of the augmentation operations from a respective set of discrete and operation-specific available magnitudes, wherein the set of discrete and operation-specific available magnitudes comprise user-selected hyperparameters.

12. The computing system of claim 1, wherein modifying the one or more parameters of the first neural network based on the reward function comprises backpropagating the reward function through the first neural network to modify the one or more parameters of the first neural network.

13. The computing system of claim 1, wherein the controller model is configured to select the series of one or more augmentation operations through performance of evolutionary mutations, and wherein the operations further comprise, for each of the plurality of iterations, determining whether to retain or discard the series of one or more augmentation operations based at least in part on the one or more performance characteristics.

14. The computing system of claim 1, wherein training the machine-learned object detection model based at least in part on the one or more augmented images comprises:

evaluating, for each augmented image, a loss function that compares a predicted location for the bounding shape of the augmented image that was predicted by the machine-learned object detection model based on the augmented image to a ground truth location for the bounding shape; and backpropagating the loss function through the machine-learned object detection model.

15. The computing system of claim 1, wherein, for each iteration, a number of augmentation operations in the series of one or more augmentation operations is selected by the controller model.

16. The computing system of claim 1, wherein, for each iteration, a number of augmentation operations in the series of one or more augmentation operations is a user-selected hyperparameter.

17. The computing system of claim 1, wherein the first neural network of the controller model comprises a recurrent neural network.

18. The computing system of claim 1, wherein the operations further comprise:

obtaining a second training dataset comprising a second plurality of training images;

performing, on one or more second training images of the second plurality of training images to generate one or more second augmented images, at least one of the series of one or more augmentation operations selected by the first neural network of the controller model in at least one of the plurality of iterations; and training a second machine-learned object detection model based at least in part on the one or more second training images.

19. A computer-implemented method, comprising:

accessing, by one or more computing devices, a training dataset that comprises a plurality of training images, wherein one or more training images of the plurality of training images has been annotated with a bounding shape, and wherein a location of the bounding shape for the one or more training images corresponds to a location of a target object within the one or more training images; and for each of a plurality of iterations:

selecting, by a controller model implemented by the one or more computing devices, the controller model comprising a first neural network configured to select augmentation operations, a series of one or more augmentation operations;

performing, by the one or more computing devices, the series of one or more augmentation operations on each of one or more training images to generate one or more augmented images;

training, by the one or more computing devices, a machine-learned object detection model based at least in part on the one or more augmented images, wherein the machine-learned object detection model comprises a second neural network configured to detect objects in imagery, and wherein the second neural network is separate from the first neural network;

after training the machine-learned object detection model, evaluating, by the one or more computing devices, one or more performance characteristics of the machine-learned object detection model;

evaluating, by the one or more computing devices, a reward function based at least in part on the one or more performance characteristics; and modifying, by the one or more computing devices, one or more parameters of the first neural network based on the reward function.

20. One or more non-transitory computer-readable media that collectively store instructions that, when executed by one or more computing devices, cause the one or more computing devices to perform operations, the operations comprising:

accessing a training dataset that comprises a plurality of training images, wherein one or more training images of the plurality of training images has been annotated with a bounding shape, and wherein a location of the bounding shape for the one or more training images corresponds to a location of a target object within the one or more training images; and for each of a plurality of iterations:

selecting, by a controller model, the controller model comprising a first neural network configured to select augmentation operations, a series of one or more augmentation operations;

performing the series of one or more augmentation operations on each of one or more training images to generate one or more augmented images;

training a machine-learned object detection model based at least in part on the one or more augmented images, wherein the machine-learned object detection model comprises a second neural network configured to detect objects in imagery, and wherein the second neural network is separate from the first neural network;

after training the machine-learned object detection model, evaluating one or more performance characteristics of the machine-learned object detection model;

evaluating a reward function based at least in part on the one or more performance characteristics; and modifying one or more parameters of the first neural network based on the reward function.

* * * * *